United States Patent
Ben-Asher et al.

(10) Patent No.: US 6,702,252 B2
(45) Date of Patent: Mar. 9, 2004

(54) ARMATURE FOR SOLENOID DEVICES SUCH AS VALVES

(76) Inventors: Eldad Ben-Asher, 48 Keren Hayerod Street, Ramat Hasharon 47248 (IL); Micha Caro, Kibbutz Geva 18975, Kibbutz Geva (IL)

( * ) Notice: Subject to any disclaimer, the term of this patent is extended or adjusted under 35 U.S.C. 154(b) by 31 days.

(21) Appl. No.: 10/095,226

(22) Filed: Mar. 12, 2002

(65) Prior Publication Data

US 2002/0125451 A1 Sep. 12, 2002

(30) Foreign Application Priority Data

Mar. 12, 2001 (IL) .................................................. 141989

(51) Int. Cl.$^7$ ............................................... F16K 31/02
(52) U.S. Cl. .................. 251/129.19; 251/129.2
(58) Field of Search .................. 251/129.19, 129.2, 251/333, 334

(56) References Cited

U.S. PATENT DOCUMENTS

| | | | | |
|---|---|---|---|---|
| 3,295,079 A | * | 12/1966 | Brown .................. | 251/129.19 |
| 3,737,141 A | * | 6/1973 | Zeuner .................. | 251/129.19 |
| 4,790,346 A | * | 12/1988 | Kolze et al. ............. | 251/129.2 |
| 5,209,455 A | * | 5/1993 | Uetsuhara et al. ..... | 251/129.19 |
| 5,261,610 A | * | 11/1993 | Waryu et al. .......... | 251/129.19 |

* cited by examiner

Primary Examiner—John Bastianelli
(74) Attorney, Agent, or Firm—Larson & Taylor, PLC

(57) ABSTRACT

The invention provides an impact armature for a solenoid device, adapted to move and perform a working stroke when the solenoid device is activated, the armature including a ferromagnetic armature provided with shoulder means; an effector member made of a non-ferromagnetic material and provided with counter-shoulder means whereby the effector member is engageable by the shoulder means of the armature; characterized in that, in operation, the armature performs a two-phase working stroke, wherein, in a first phase, the armature moves relative to the effector member for a relatively short, predetermined distance while the effector member remains stationary, and, in a second phase, the armature completes its working stroke, the shoulder means engaging the counter-shoulder means, thereby carrying along the effector member.

3 Claims, 4 Drawing Sheets

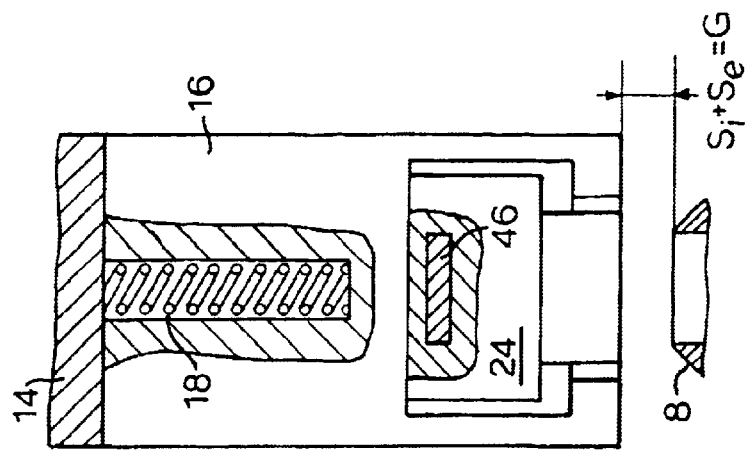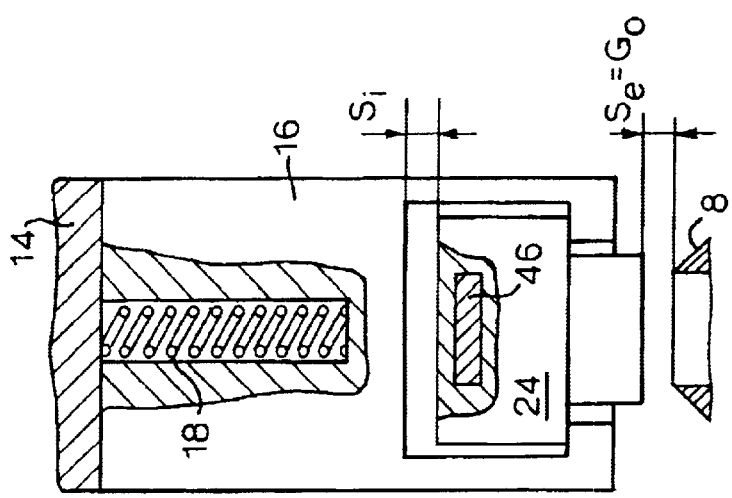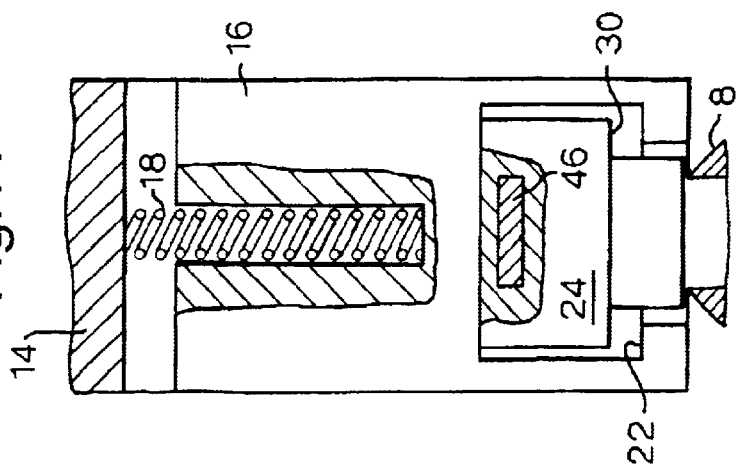

ARMATURE FOR SOLENOID DEVICES SUCH AS VALVES

FIELD OF THE INVENTION

The present invention relates to an impact armature for solenoid devices.

BACKGROUND OF THE INVENTION

The armature of prior-art solenoid devices such as, e.g., solenoid valves, has to overcome two forces when the latter is actuated: the force of a spring that tends to keep the armature in its normal position of rest, whether N.O. (normally open) or N.C. (normally closed), and the force of the pressurized medium that is handled by the valve. These forces act in the same direction and, therefore, add up. As the magnetic force acting on the armature diminishes with the square of the width of the air gap between the armature and the pole of the solenoid, it is often difficult to arrive at a satisfactory compromise between the need for a substantial gap width which is one of the parameters determining valve throughput, and the coil ampere-turns which determine the size, cost and power consumption of the solenoid valve.

DISCLOSURE OF THE INVENTION

It is one of the objectives of the present invention to provide a solenoid device which, compared to prior-art devices of the same type, may either have a larger gap width for the same number of ampere-turns, or the same gap width with fewer ampere-turns than the prior-art device.

According to the invention, the above object is achieved by providing an impact armature for a solenoid device, adapted to move and perform a working stroke when said solenoid device is activated, the armature comprising a ferromagnetic armature provided with shoulder means; an effector member made of a non-ferromagnetic material and provided with counter-shoulder means whereby said effector member is engageable by the shoulder means of said armature; characterized in that, in operation, said armature performs a two-phase working stroke, wherein, in a first phase, said armature moves relative to said effector member for a relatively short, predetermined distance while said effector member remains stationary, and, in a second phase, said armature completes its working stroke, said shoulder means engaging said counter-shoulder means, thereby carrying along said effector member.

The invention further provides an impact armature for a solenoid device, adapted to move and perform a working stroke when said solenoid device is activated, said armature comprising a ferromagnetic armature provided with shoulder means; an effector member made of a non-ferromagnetic material and provided with counter-shoulder means whereby said effector member is engageable by the shoulder means of said armature, and a ferromagnetic element affixed to said effector member, characterized in that, in operation, said armature performs a two-phase working stroke, wherein, in a first phase, said armature moves relative to said effector member for a relatively short, predetermined distance while said effector member remains stationary, and, in a second phase, said armature completes its working stroke, said shoulder means engaging said counter-shoulder means, thereby carrying along said effector member and causing it to move a first distance, after which the ferromagnetic element in said effector member, being attracted to said armature, causes said effector member to move an additional distance.

BRIEF DESCRIPTION OF THE DRAWINGS

The invention will now be described in connection with certain preferred embodiments with reference to the following illustrative figures, so that it may be more fully understood.

With reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail tan is necessary for a fundamental understanding of the invention, the description taken with the drawings making apparent to those skilled in the art how the several forms of the invention may be embodied in practice.

In the drawings:

Figure 1:
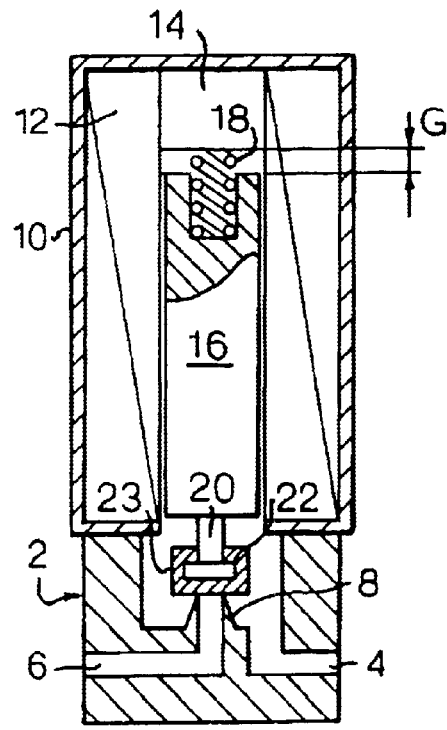
Figure 2:
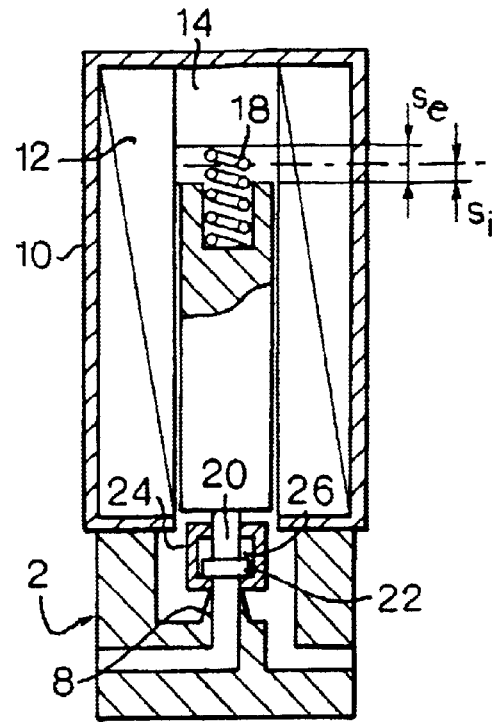
Figure 3:
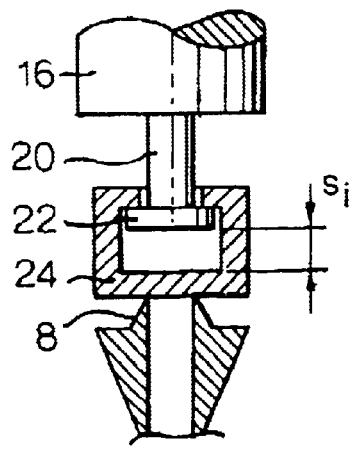
Figure 4:
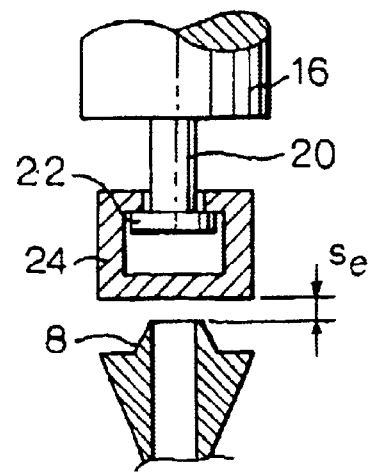
Figure 5:
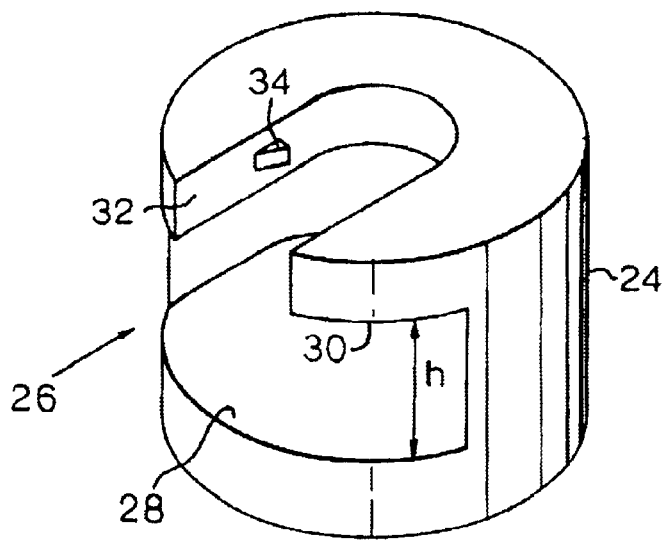
Figure 6:
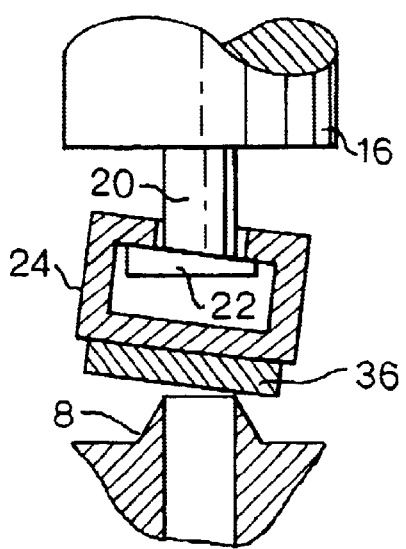
Figure 7:
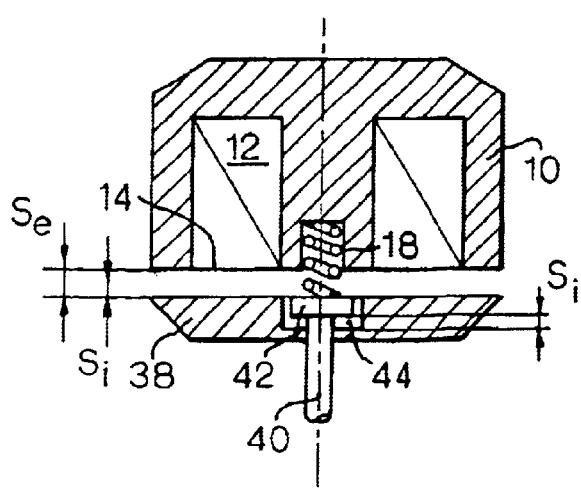
Figure 8:
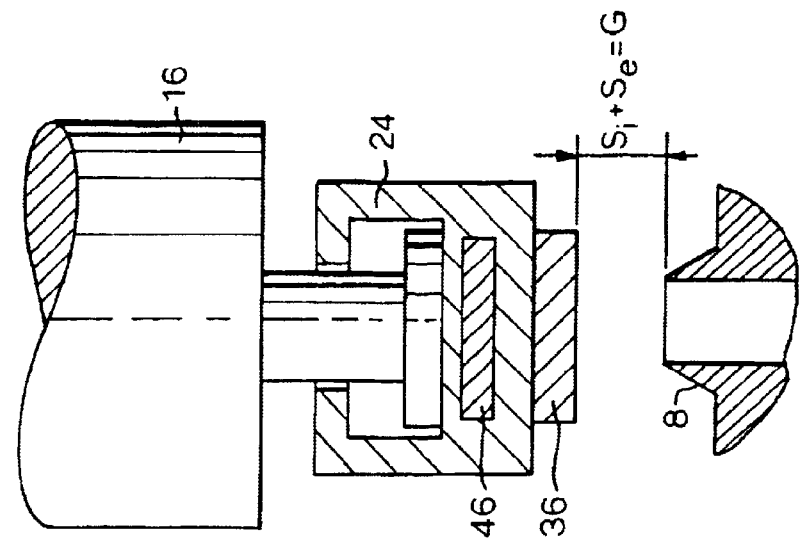
Figure 9:
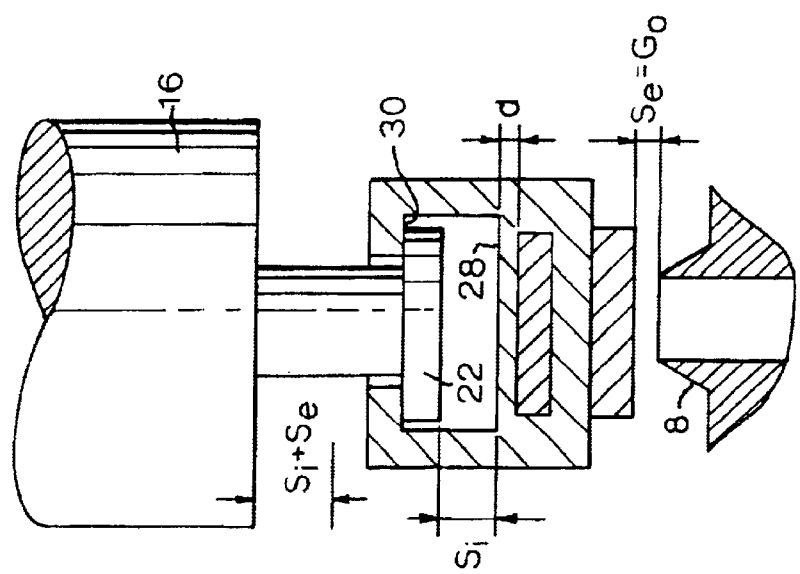
Figure 10:
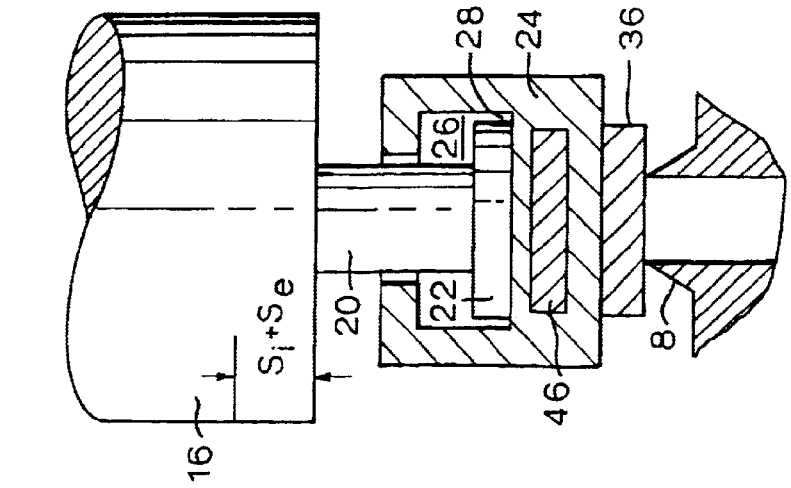

FIG. 1 schematically shows a prior-art solenoid device;

FIG. 2 is a similarly schematic representation of a solenoid device with an armature according to the invention;

FIG. 3 is a detail, showing the end portion of the plunger at the end of its idle stroke;

FIG. 4 is the same detail, showing the end portion of the plunger at the end of its effective stroke;

FIG. 5 is a greatly magnified perspective view of the effector member of FIG. 2;

FIG. 6 shows an eccentrically engaged effector member;

FIG. 7 is a schematic representation of another solenoid device with an armature according to the invention;

FIGS. 8–10 illustrate phases in the operation of a further solenoid device according to the invention, and FIGS. 11–13 represent phases in the operation of yet another solenoid device according to the invention.

DETAILED DESCRIPTION

Referring now to the drawings, there is seen in FIG. 1 a solenoid valve comprising a valve body 2 having an inlet opening 4, an outlet opening 6 and a valve seat 8. Accommodated in a jacket 10 and attached to the valve body 2 there is seen the solenoid coil 12 with its pole piece 14. Inside the coil 12 is slidably mounted the armature of the solenoid valve in the form of the plunger 16, the pole-facing end of which accommodates a helical spring 18 abutting against the pole piece 14 and biasing the plunger 16 in a direction towards the valve seat 8.

The lower end of the plunger 16 is provided with a neck portion 20 ending in a shoulder portion 22 to which is fixedly attached, preferably by molding, the effector member or valve pad 23 of the solenoid valve, consisting of a polymer or an elastomer. In this N.C. valve, the pad 23 is pressed against the valve seat by two forces, the force $F_S$ exerted by the spring 18 and the force $F_P$ produced by the pressurized medium acting on the pad 23.

The problem of this prior-art solenoid device resides in the fact that while, upon actuation, the attractive magnetic force F, in order to pull up the plunger 16 and open the valve, must fulfill the condition $F_M > (F_S + F_P)$, it is in fact at its relatively weakest, due to the above-mentioned relationship between the gap width G (necessary to achieve a certain throughput) and the attractive force $F_M$ of the magnetic field.

A solenoid valve incorporating the impact armature according to the invention is shown in FIG. 2. While the stationary parts (2–14) of the device are substantially identical with those of the prior-art device, the difference resides in the effector member or, in the case of a solenoid valve, the valve pad 24 which, in contradistinction to the prior-art pad 23, is not fixedly attached to the lower end of the armature or plunger 16, but, in a T-slot-like recess 26 (seen to best advantage in FIGS. 3–5), slidingly accommodates both the neck portion 20 and the shoulder portion 22 of the lower end of the plunger 16. The lower, wider portion of the recess 26 is of a height h (FIG. 5) considerably exceeding the thickness of the shoulder portion 22 of the plunger end, so that the plunger 16 can move from the position shown in FIG. 2, in which the lower surface of shoulder portion 22 touches the bottom surface 28 of recess 26, to the position shown in FIG. 3, in which the upper, annular surface of shoulder portion 22 approaches the "ceiling," or counter-shoulder portion 30 of the wider portion of recess 26, without lifting pad 24 off the valve seat 8. Only a further, upward movement of the plunger 16 causes shoulder portion 22 to effectively engage pad 24 and, dragging it along, lifts it off the valve seat 8.

It is this combination of the initial "idle" plunger stroke $S_i$ (FIG. 3) and the subsequent effective stroke $S_e$ (FIG. 4) that allows the armature according to the invention to circumvent the above-mentioned condition $F_M>(F_S+F_P)$. At the instant of actuation, the magnetic attraction $F_M$, now at its weakest, need only overcome the biasing force $F_S$ of the spring 18, i.e., the condition is now $F_M>F_S$ only. During the idle stroke $S_i$, the plunger 16 gathers momentum so that when, at the end of the idle stroke $S_i$, its head portion 22 impacts (hence "impact armature") the valve pad 24, the kinetic energy accumulated by the plunger 16 during the idle stroke $S_i$ enables even a relatively weak $F_M$ to overcome the combined forces $F_S+F_P$ now coming into action. The total working stroke of the plunger 16 is, of course, $S_i+S_e$.

FIG. 5 is an enlarged perspective view of the effector member, in this case, valve pad 24. Seen is the T-slot-like recess 26, the wider portion of which is of a height h, extending from the bottom surface 28 to the "ceiling" or counter-shoulder portion 30. The slot 32 slidingly accommodates the neck portion 20 of plunger 16. A wedge-like nib 34 serves as a snap-in retainer, preventing the dislocation of pad 24.

While in FIGS. 2–5 the valve pad 24 was shown as a single-piece element, it is advantageous to make it as a compound part, the body of the pad consisting of, e.g., a rigid polymer, while tie sealing element is a disk 36 made of an elastomer such as, e.g., neoprene, fixedly attached to the polymer body (see also FIG. 6).

A variant of the plunger-valve pad arrangement is shown in FIG. 6. Here the upper, impacting surface of shoulder portion 22 is either slanting relative to the plunger axis as shown, or has local projection, whereby upon impact, the valve pad 24 is first tilted, as seen in FIG. 6, before being fully lifted off, the leverage obtained reducing the effective magnitude of $F_P$. The lower surface of shoulder portion 22 is obviously perpendicular to the plunger axis. Alternatively, the slanting surface or local projection may be provided in the recess 26.

Another variant of the impact armature according to the invention is illustrated in FIG. 7, showing a solenoid actuator. The armature, in this case, is a disk 38 attracted to the jacket 10, which accommodates the coil 12. The effector member consists of rod 40, the lower end of which is linked to the element to be moved, e.g., the pawl of a pawl-and-ratchet arrangement, but possibly also to the sealing pad of a valve. Its upper end carries a head or shoulder 42, biased in the downward direction by helical spring 18 and accommodated in a cylindrical counter-shoulder 44 in armature 38. FIG. 7 shows the actuator in the position of rest, in which shoulder 42 does not contact the bottom surface of counter-shoulder 44, but is located at a distance above this surface. This distance corresponds to the length of the idle stroke $S_i$. When the solenoid is actuated, the armature 38 moves up the distance $S_i$, its surface then being indicated by the dash-dotted line below pole piece 14. At this instance, it impacts shoulder 42 and drags it along for the entire length of the effective stoke $S_e$.

FIGS. 8–10 illustrate three stages in the operation of a further solenoid valve according to the invention.

The main structural difference between this and the previous embodiments of the invention is a ferromagnetic disk 46 embedded in the lower portion of the valve pad 24, the function of which disk will become apparent in the following description.

FIG. 8 shows the active elements of the solenoid, namely, plunger 16 and valve pad 24, in the closed position of the solenoid, with plunger shoulder 22 being pressed against the bottom surface 28 of valve pad recess 26 (see also FIG. 5) and thus, pressing the sealing element 36 against valve seat 8. Seen also is the ferromagnetic disk 46 embedded in valve pad 24.

In FIG. 9, the solenoid has been switched on, the plunger 16 has moved upwards for a distance $S_i+S_e$ until stopped by solenoid pole piece 14 (not shown), while its shoulder 22 has impacted on the counter-shoulder 30 of valve pad recess 26, lifting valve pad 24 for a very small distance $S_e$, just enough to eliminate the medium pressure $F_P$, but not enough to provide the required valve throughput. In the next phase (FIG. 10), valve pad 24, no longer under medium pressure $F_P$, is free to follow the magnetic attraction between plunger shoulder 22 and ferromagnetic disk 46, moving up until stopped by plunger shoulder 22, at which instant the gap G between valve seat 8 and sealing element 36 assumes its full value, namely, $S_i+S_e$. The advantage of this embodiment resides in the fact that, to attain a given gap G, the total stroke length $S_i$ demanded of plunger 16 is significantly shorter than it is with the embodiment of FIGS. 2–4, being the sum of the idle stroke $S_i$ of the plunger and the initial gap $G_o=S_e$ (FIG. 9). Thus, $S_r=S_i+S_e$, while, in the first embodiment, given the same gap $G=S_i+S_e$, the total plunger stroke length $S_r$ would be the sum of $S_i$ and the final gap $G=S_i+S_e$, thus, $S_r=S_i+(S_i+S_e)=2S_i+S_e$ The difference in total stroke length $S_r$ would therefore equal $S_i$.

The distance d (FIG. 9) between ferromagnetic disk 46 and the bottom 28 of recess 26 is of importance, as it controls the strength of the magnetic attraction between plunger 16 and disk 46, which must be neither too strong at the beginning of the working stroke, nor too weak towards its end.

While disk 46 was conceived as being made of soft iron and, thus, not permanently magnetizable, applications are envisaged in which the disk could advantageously constitute a permanent magnet.

The embodiment illustrated in FIG. 11 is basically identical to that shown in FIG. 8, with the difference residing in the fact that where, in the embodiment of FIG. 8, the effector member 24 surrounds the end of plunger 16, in the embodiment of FIG. 11 the end of plunger 16 surrounds the effector member 24.

FIGS. 12 and 13 illustrate the phases of operation of the embodiment of FIG. 11 and are analogous to the fully described FIGS. 9 and 10.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An impact armature for a solenoid device, adapted to move and perform a working stroke when said solenoid device is activated, said armature comprising:

a ferromagnetic armature provided with shoulder means;

an effector member made of a non-ferromagnetic material and provided with counter-shoulder means whereby said effector member is engageable by the shoulder means of said armature, and a ferromagnetic element affixed to said effector member, characterized in that, in operation, said armature performs a three-phase working stroke, wherein, in a first phase, said armature moves relative to said effector member for a relatively short, predetermined distance while said effector member remains stationary, and, in a second phase, said armature completes its working stroke, said shoulder means engaging said counter-shoulder means, thereby carrying along said effector member and causing it to move a first distance, after which the ferromagnetic element in said effector member, being attracted to said armature, causes said effector member to move an additional distance.

2. The impact armature as claimed in claim 1, wherein said ferromagnetic element is disk-like, with its axis in substantial alignment with the axis of said armature.

3. The impact armature as claimed in claim 1, where said armature is substantially cylindrical.

* * * * *